US009853442B2

(12) United States Patent
Chen et al.

(10) Patent No.: US 9,853,442 B2
(45) Date of Patent: Dec. 26, 2017

(54) PROTECTION DEVICE WITH DIRECTIONAL ZONE SELECTIVE INTERLOCK FUNCTIONALITY

(71) Applicant: Siemens Aktiengesellschaft, Munich (DE)

(72) Inventors: Wei Gang Chen, Shanghai (CN); Mario Dankert, Raguhn-Jessnitz (DE); Li Ming Huang, Beijing (CN); Yue Zhuo, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 656 days.

(21) Appl. No.: 14/479,403

(22) Filed: Sep. 8, 2014

(65) Prior Publication Data
US 2015/0092309 A1 Apr. 2, 2015

(30) Foreign Application Priority Data
Sep. 10, 2013 (CN) .......................... 2013 1 0410043

(51) Int. Cl.
*H02H 7/26* (2006.01)
*H02H 3/28* (2006.01)
*H02H 7/30* (2006.01)

(52) U.S. Cl.
CPC .............. *H02H 3/28* (2013.01); *H02H 7/262* (2013.01); *H02H 7/30* (2013.01)

(58) Field of Classification Search
CPC ................................ H02H 7/262; H02H 3/28
See application file for complete search history.

(56) References Cited

U.S. PATENT DOCUMENTS 5,784,237 A * 7/1998 Velez ..................... H02H 7/262
361/115
8,737,030 B2 * 5/2014 Valdes .................. H02H 7/262
361/62

(Continued)

FOREIGN PATENT DOCUMENTS

CN 101771269 A 7/2010
CN 101916988 A 12/2010

OTHER PUBLICATIONS

CN201310150057.5. Apr. 26, 2013.*
Chinese Office Action dated Dec. 29, 2016.

*Primary Examiner* — Stephen W Jackson
*Assistant Examiner* — Christopher Clark
(74) *Attorney, Agent, or Firm* — Harness, Dickey & Pierce, P.L.C.

(57) ABSTRACT

A protection device, externally connectable to an existing circuit breaker with zone selective interlock functionality, enables a circuit breaker to implement directional zone selective interlock. The protection device includes a first input port and a first output port connectable to a circuit breaker, and second and third ports for connecting to a protection device of another circuit breaker and for transmitting interlock signals via an input bus and an output bus inside the EDP. A control unit is configured to enable one of the second and third ports as a second input port and the other as a second output port according to the direction of current currently flowing through the circuit breaker; and configured to forward an interlock signal from the first input port to the output bus and to forward an interlock signal on the input bus received from the second input port to the first output port.

17 Claims, 8 Drawing Sheets

(56) References Cited

U.S. PATENT DOCUMENTS

| | | | |
|---|---|---|---|
| 2008/0158750 A1 | 7/2008 | Premerlani et al. | |
| 2008/0198521 A1* | 8/2008 | Weiher | H02H 7/262 |
| | | | 361/64 |
| 2010/0181152 A1 | 7/2010 | Anderson | |
| 2012/0265360 A1* | 10/2012 | Smit | G05F 1/66 |
| | | | 700/293 |
| 2014/0192458 A1* | 7/2014 | Valdes | H01H 83/00 |
| | | | 361/626 |
| 2014/0319929 A1* | 10/2014 | Chen | H01H 9/54 |
| | | | 307/115 |
| 2015/0112499 A1* | 4/2015 | Hulse | H02H 7/262 |
| | | | 700/292 |

* cited by examiner

PROTECTION DEVICE WITH DIRECTIONAL ZONE SELECTIVE INTERLOCK FUNCTIONALITY

PRIORITY STATEMENT

The present application hereby claims priority under 35 U.S.C. §119 to Chinese patent application number CN 201310410043.2 filed Sep. 10, 2013, the entire contents of which are hereby incorporated herein by reference.

TECHNICAL FIELD

At least one embodiment of the present invention relates generally to protection of power distribution networks, in particular to directional zone selective interlocking for circuit breakers in a power distribution network.

BACKGROUND ART

Zone selective protection, also called zone selective interlock (ZSI) is a method of reducing the impact on the various power distribution devices in a power distribution network in the event of a short circuit fault by shortening the time taken to eliminate the fault as much as possible. To be specific, supposing a fault occurs in a multi-stage power distribution network supplied by a single power source, then every circuit breaker which detects the fault must report detection of the fault to the circuit breaker lying upstream of itself, i.e. send an interlock signal. Thus, only those circuit breakers which receive no report are determined as being the circuit breakers closest to the fault point and perform instantaneous protection (e.g. delay time t=50 ms), i.e. perform a disconnecting action with the shortest delay time. The circuit breakers which receive a report perform timed protection, also called "locking". By "timed protection" or "locking" is meant: if the fault has still not been eliminated (e.g. the protecting action of a circuit breaker closer to the fault point fails) after a preset delay time (e.g. 100 ms), the circuit breaker opens, otherwise it maintains the connection. Clearly, ZSI enables selective actions of circuit breakers.

The increased complexity of power distribution networks with multiple power sources means that the simple ZSI described above is not suitable for use in such networks. In view of this, directional zone selective interlock (DZSI) has been proposed, the basic principle thereof being as follows: the fault point is identified on the basis of the relationship among the directions of currents flowing through the various circuit breakers when the fault occurs, and a delay time is then determined for the action of each circuit breaker in order to eliminate the identified fault. The advantage of this method is that selective protection can be achieved more reliably even if the network contains multiple power sources or an active load.

There are many methods for implementing DZSI in the prior art. A method for implementing DZSI is disclosed in Chinese patent application No. 200910266751.7, disclosed on Jul. 7, 2010. The method in question used one independent processor to manage the various circuit breakers in a power distribution network, i.e. the processor monitored the fault current direction of each circuit breaker via a communication path connected to each circuit breaker, and on this basis indicated a delay time for the action of the relevant circuit breaker.

SUMMARY

At least one embodiment of the present invention provides a protection device which implements a directional zone selective interlock (DZSI) function at a circuit breaker, this protection device being capable of being connected to an existing circuit breaker without changing the structure of the electronic trip unit of the existing circuit breaker, and being capable of achieving distributed DZSI management. Thus, the use of such a protection device requires no alteration to an existing ZSI circuit breaker, i.e. the circuit breaker can be upgraded from ZSI protection to DZSI protection by connecting the protection device externally.

According to another aspect of an embodiment of the present invention, the present invention also provides a circuit breaker apparatus, comprising: a circuit breaker, for switching a power supply line on or off; an electronic trip unit, for monitoring a current flowing through the circuit breaker and controlling the switching of the circuit breaker on or off, and comprising an interface unit, for receiving or sending an interlock signal; and the abovementioned protection device for implementing DZSI. The second and/or third port of the protection device can be connected to a corresponding port of a protection device of another circuit breaker apparatus.

BRIEF DESCRIPTION OF THE DRAWINGS

The objects, characteristics, features and advantages of the present invention will be made more obvious by the following detailed description of example embodiments which makes reference to the accompanying drawings.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Various embodiments of the present invention are described below with reference to the accompanying drawings. The following description of example embodiments will make the abovementioned advantages of the present invention easier to understand.

At least one embodiment of the present invention provides a protection device which implements a directional zone selective interlock (DZSI) function at a circuit breaker, this protection device being capable of being connected to an existing circuit breaker without changing the structure of the electronic trip unit of the existing circuit breaker, and being capable of achieving distributed DZSI management. Thus, the use of such a protection device requires no alteration to an existing ZSI circuit breaker, i.e. the circuit breaker can be upgraded from ZSI protection to DZSI protection by connecting the protection device externally.

Another embodiment of the present invention is to reduce the complexity of the circuitry in the protection device, and reduce the number of independent power sources allocated for the device, in order to reduce the volume of the protection device and lower its cost.

According to an embodiment of the present invention, a protection device for implementing DZSI may be connected to a circuit breaker in a power distribution network, the circuit breaker being equipped with an interface unit capable of sending or receiving an interlock signal. The protection device comprises: a first port pair, comprising a first input port and a first output port which are both capable of being connected to the interface unit; a second port and a third port, capable of being coupled to corresponding ports of a DZSI protection device of another circuit breaker in the power distribution network, to transmit the interlock signal; an internal input bus, configured so as to be connected to the first input port and the second and third ports, to transmit an interlock signal received by the protection device; an internal output bus, configured so as to be connected to the second and third ports, to transmit an interlock signal to be sent from the protection device; a control unit, for controlling the first port pair and the second and third ports, being configured to enable one of the second and third ports as a second output port and the other as a second input port, in response to the detected direction of a current currently flowing through the circuit breaker; and forwarding the interlock signal on the input bus that is received from the first input port onto the internal output bus, and/or forwarding an interlock signal on the input bus that is received from the second input port to the first output port.

Preferably, the first input port comprises a first input circuit, which is coupled to the input bus and comprises a driving power supply, and is used for transmitting an interlock signal on the input bus to the control unit; the first output port is further connected to a first output circuit, which is coupled to the first output port, and used for sending from the first output port an interlock signal from the control unit by way of signal isolation; the control unit is further connected to a second output circuit, which is coupled to the output bus, and used for outputting an interlock signal from the control unit to the output bus by way of signal isolation.

Preferably, the control unit is further configured to enable the second port of the second and third ports as a second output port, and the third port as a second input port, when the direction of a current currently flowing through the circuit breaker and a preset current reference direction are the same; and when they are not the same, to enable the third port as a second output port, and the second port as a second input port.

Preferably, a second input switch and a second output switch associated with the second port are provided on the input bus and the output bus, respectively, and a third input switch and a third output switch associated with the third port are provided on the input bus and the output bus, respectively, wherein the control unit controls the second and third input/output switches, to enable the relevant port. More preferably, the second and third input/output switches comprise isolating switch elements, for example photocouplers.

Preferably, the control unit determines the direction of current currently flowing through the circuit breaker according to detected phase current and line voltage, and the protection device is further coupled to: a current mutual inductor, for detecting the phase current; and a voltage sensing circuit, for detecting the line voltage. More preferably, the control unit is powered by the current mutual inductor. The control unit is powered by at least one of line voltage and the current mutual inductor. Optionally, the current mutual inductor comprises an iron-cored current mutual inductor and a Rogowski coil. Optionally, the driving power supply in the first input circuit is powered by a current mutual inductor coupled to the protection device.

According to another aspect of an embodiment of the present invention, the present invention also provides a circuit breaker apparatus, comprising: a circuit breaker, for switching a power supply line on or off; an electronic trip unit, for monitoring a current flowing through the circuit breaker and controlling the switching of the circuit breaker on or off, and comprising an interface unit, for receiving or sending an interlock signal; and the abovementioned protection device for implementing DZSI. The second and/or third port of the protection device can be connected to a corresponding port of a protection device of another circuit breaker apparatus.

The protection device according to the embodiments of the present invention can determine the correct direction in which to transmit an interlock signal based on the direction of a current currently flowing through a circuit breaker, so as to transmit the interlock signal to the corresponding interface (forward interface or backward interface). Thus, it is possible to upgrade to a protection device with DZSI functionality by connecting this protection device externally, without altering the ZSI design of an existing circuit breaker (e.g. MCCB), so upgrading of existing apparatus is simpler.

With regard to interlock signals from other circuit breakers, when the solution proposed in an embodiment of the present invention is adopted, the control unit in the protection device is responsible for enabling the corresponding forward or backward channel according to the direction of current, input or output interlock signals are automatically transmitted on the buses, and the control unit does not need to forward interlock signals to each port. Thus, the control circuitry and control logic of the control unit is simplified.

Furthermore, since an internal input bus and internal output bus have been introduced, the various port interfaces can share the same set of input circuits or output circuits, with no need for a separate input/output circuit part for each port to be set up in the protection device. Moreover, since the control unit is responsible for forwarding interlock signals, the load on the input circuit in the protection device is just a downstream protection device. Since there is no need to recalculate the load problem of the input circuit, such a design enables a huge enhancement in the expandability and flexibility of the power distribution network, while simplifying the complexity and cost of maintenance.

In the embodiments of the present invention, the protection device only contains one 15 V power supply for the input circuit and one 3.3 V power supply for the control unit. Compared to the situation in the prior art, the design of at least one embodiment of the present invention simplifies the circuit complexity in the protection device as well as the number of independent power supplies. In addition, power for the 15 V and 3.3 V power supplies may be provided by a current mutual inductor. Therefore the EDP can be self-powered.

Figure 1:
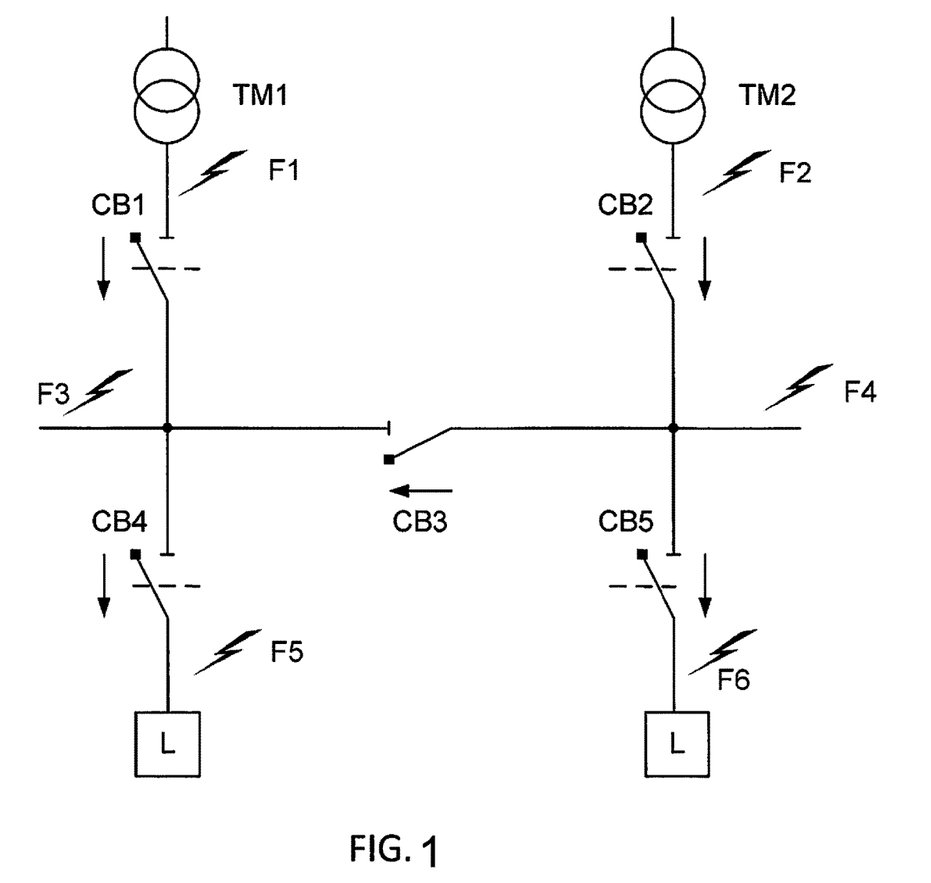
FIG. 1 shows an application scenario for DZSI according to an embodiment of the present invention.

FIG. 1 shows by way of example an application scenario for a DZSI system according to an embodiment of the present invention, i.e. a power distribution network structure in the form of an H-bridge. As FIG. 1 shows, the H-bridge structure comprises two power sources TM1 and TM2, which supply power to two passive loads L separately. A circuit breaker (CB) is provided on each bridge arm of the H-bridge structure, namely CB1, CB2, CB4 and CB5, respectively, while a connecting circuit breaker CB3 is also provided on the middle bridge. The arrow near each circuit breaker in FIG. 1 indicates a current reference direction. The current reference direction is, for example, the direction of current flowing through the circuit breaker under normal circumstances (e.g. when the circuit breaker is conducting). Under normal circumstances, the current flowing through the connecting circuit breaker CB3 is very small. For this reason, the current reference direction thereof is preset here as "to the left" for example, as shown in the figure.

In the H-bridge structure application scenario shown in FIG. 1, a short circuit fault may occur at 6 fault points as shown in FIG. 1, i.e. fault points F1-F6. Here, the short circuit fault may be brought about by a number of factors, e.g. shorting of phase conductors, or a grounding fault. In FIG. 1, fault point F1 occurs for example between power source TM1 and circuit breaker CB1, fault point F4 occurs for example at the junction on the right-hand side of the connecting circuit breaker CB3, and fault point F6 occurs near the passive load on the right-hand side of the figure. The direction in which an interlock signal is transmitted between circuit breakers will be different for the different faults shown in FIG. 1, in accordance with the principle of ZSI.

Figure 2A:
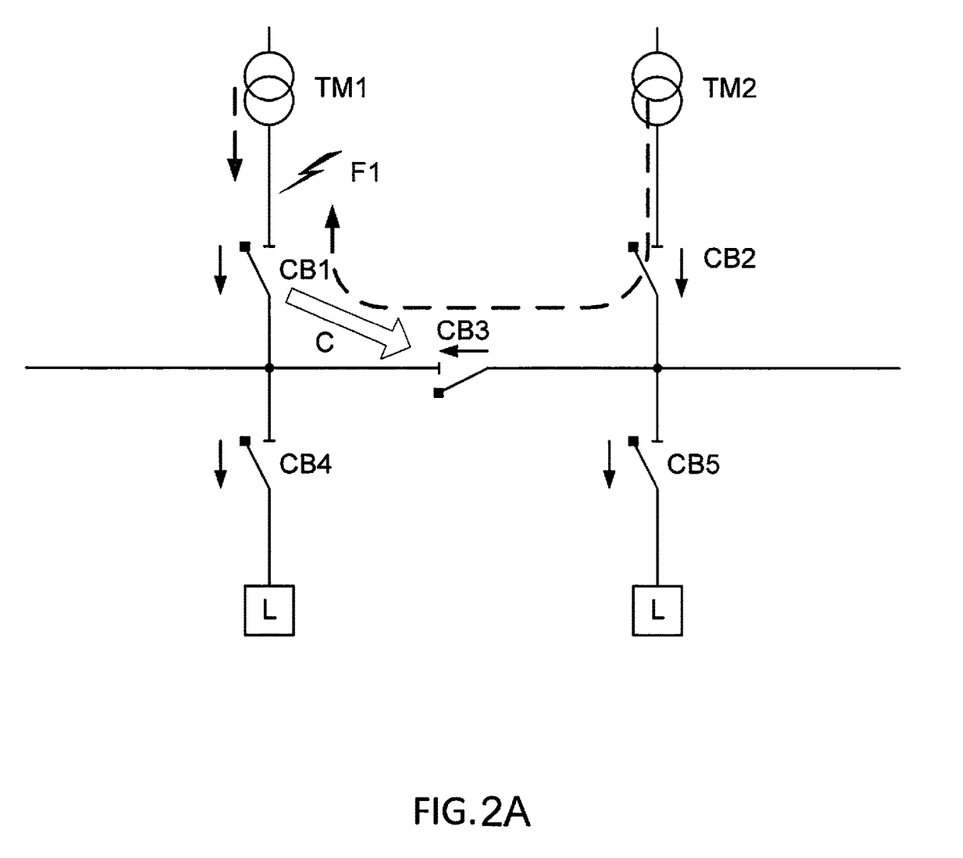
FIG. 2A shows the flow direction of a fault current when a fault of one type occurs in the scenario shown in FIG. 1.
Figure 2B:
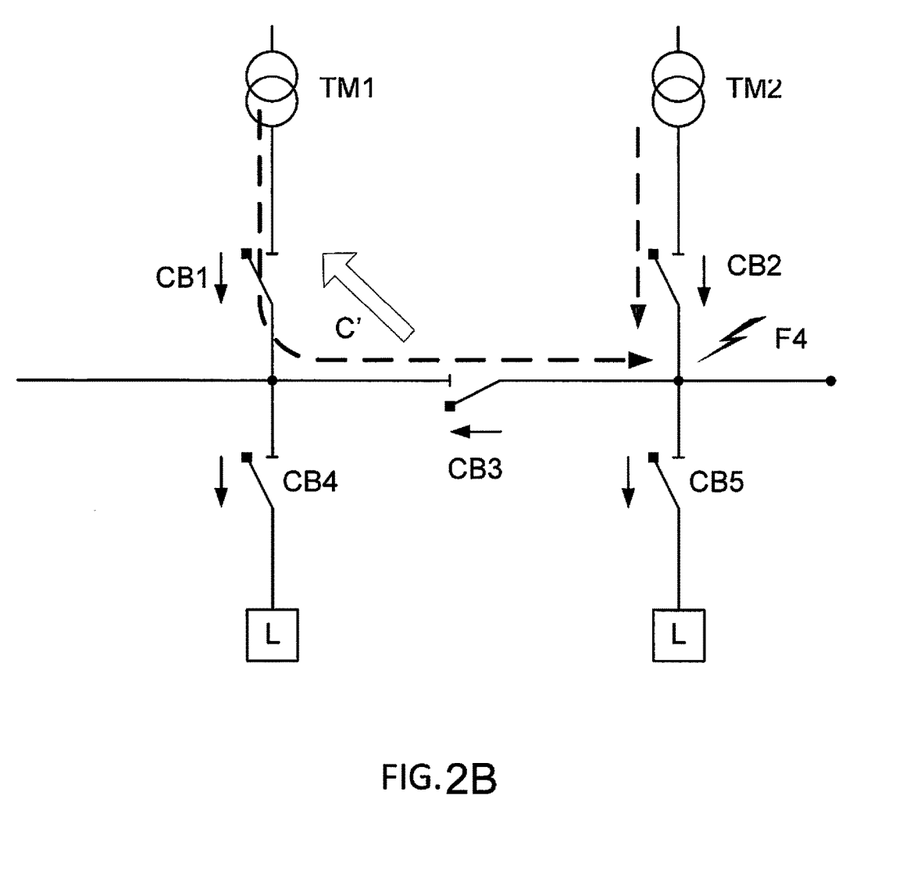
FIG. 2B shows the flow direction of a fault current when a fault of another type occurs in the scenario shown in FIG. 1.

FIGS. 2A and 2B show by way of example the fault current flow directions and the directions in which interlock signals are transmitted between circuit breakers in two fault situations. In FIG. 2A, if a fault occurs at point F1, the currents outputted by TM1 and TM2 form a fault current and converge at fault point F1, i.e. the fault current flows as shown by the dotted arrow in FIG. 2A. At this point, the directions of the fault currents flowing through circuit breakers CB2 and CB3 are the same as their respective current reference directions, whereas the direction of the fault current flowing through CB1 is opposite to the preset "downward" current reference direction thereof. CB4 and CB5 are connected to passive loads and so have no current flowing therethrough. Thus, in accordance with the principle of ZSI, the fault can be eliminated as long as CB1 opens immediately, and so the delay time d0 for the action of CB1 is shortest. If CB1 fails, the fault can also be eliminated if CB3 opens, so the delay time d1 of CB3 satisfies d1>d0. If CB3 also fails, CB2 must then be opened, so the delay time d2 of CB2 is longest, satisfying d2>d1. CB4 and CB5 are connected to the passive loads L and therefore are unable to eliminate the fault F1, and so can remain in a conducting state at all times. Thus, upon detecting a fault, CB1 must transmit an interlock signal to CB3 (as shown by arrow C in the figure); CB3 in turn detects the fault and then transmits an interlock signal to CB2. After receiving interlock signals, CB2 and CB3 can set their respective delay times d1 and d2, respectively, and enter an interlocked state, and only implement a protecting action if the fault is still present when their respective delay times expire.

In FIG. 2B, suppose that a fault occurs at point F4. Then the currents outputted by TM1 and TM2 form a fault current and converge at fault point F4, i.e. the fault current flows as shown by the dotted arrow in FIG. 2B. At this point, the directions of the fault currents flowing through circuit breakers CB1 and CB2 are the same (referred to as Fwd) as the current reference directions thereof, whereas the direction of the fault current flowing through CB3 is opposite (referred to as Bwd) to the preset current reference direction "to the left" thereof. Similarly, in accordance with the abovementioned ZSI principle, the delay time d0 for the actions of CB2 and CB3 is shortest, with the delay time d1 for CB1 coming next, d1>d0. Thus, after detecting the fault, CB3 must transmit an interlock signal to CB1 (as shown by arrow C' in the figure), so that CB1 sets its action delay time as d1, and enters an interlocked state. As can be seen from FIGS. 2A and 2B, under different fault conditions, the change in direction of fault currents is related to the direction in which interlock signals are transmitted between circuit breakers (e.g. CB1 and CB3), so it is necessary to introduce directional zone selective interlock (DZSI) as a solution.

Figure 3:
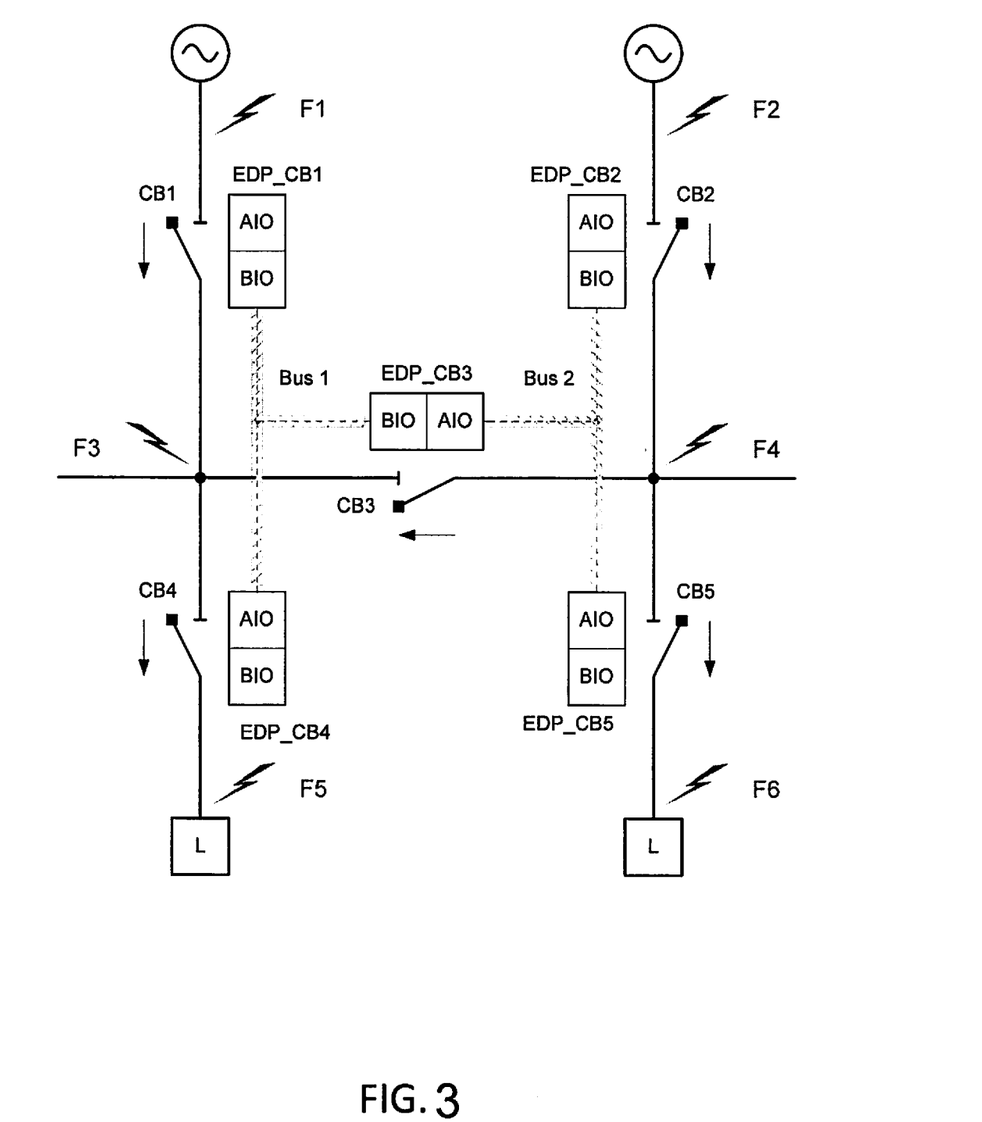
FIG. 3 shows a method of connecting a DZSI protection device according to an embodiment of the present invention in the application scenario shown in FIG. 1.

FIG. 3 shows by way of example a DZSI solution according to an embodiment of the present invention in the application scenario shown in FIG. 1. As shown in FIG. 3, in an embodiment of the present invention, each circuit breaker CBn is equipped with a protection device (abbreviated as EDP: External Directional Protection Unit) capable of implementing DZSI (EDP_CBn denotes the EDP used for a certain circuit breaker CBn). Each EDP can achieve the determination of direction and the transmission of interlock signals required for DZSI, while being capable of being connected to the circuit breaker CBn through an interface as an external device, with no need to make any change to the existing circuit breaker. In the application shown in FIG. 3, the EDP-CBn of each circuit breaker comprises two ports AIO/BIO. Interlock signals are transmitted on signal buses (BUS_1, BUS_2) established between the EDP_CBn interfaces.

Figure 4:
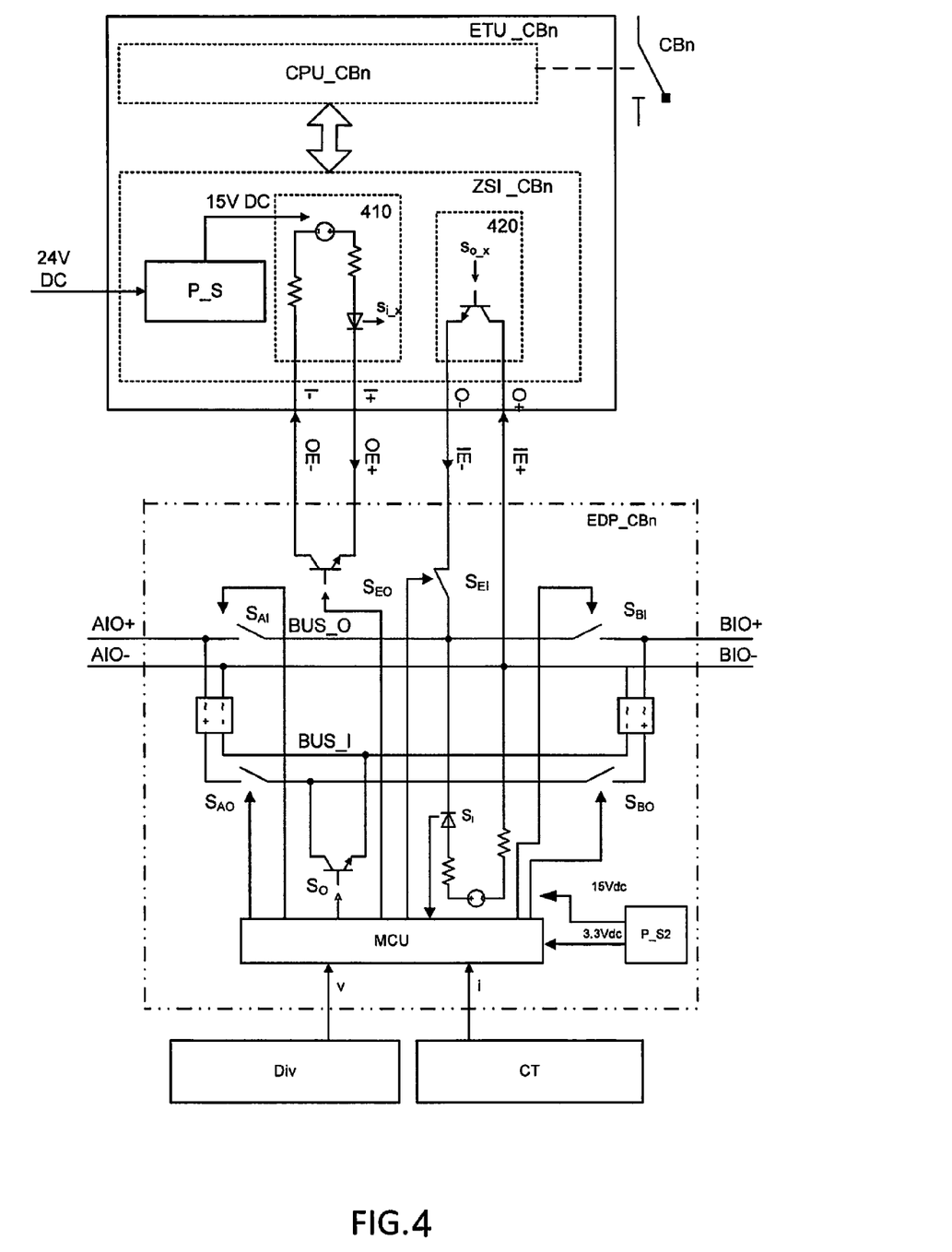
FIG. 4 shows a structural block diagram of a DZSI protection device (abbreviated EDP) according to an embodiment of the present invention connected outside a circuit breaker.

FIG. 4 is a block diagram showing the specific structure of an embodiment of an EDP_CBn shown in FIG. 3. In FIG. 4, the switching action of the circuit breaker CBn on or off is controlled by an electronic tripping unit (ETU) ETU_CBn of the circuit breaker itself. The ETU_CBn may be integrated with the CBn, as in existing molded-case circuit breakers (MCCB). The ETU_CBn specifically comprises two units, namely a CPU_CBn and a ZSI_CBn. The CPU_CBn can monitor the size of current flowing through the CBn, and on this basis discover faults, at which time it can perform a tripping action so that the CBn switches off. The ZSI_CBn is a ZSI interface unit, which can communicate with or be connected to other devices, and in this case serves the function of signal isolation and/or signal driving. The ETU_CBn in FIG. 4 can realize the basic ZSI function. The ZSI_CBn in the ETU_CBn is connected to the EDP-_CBn according to an embodiment of the present invention through a port, for the purpose of realizing the DZSI function.

To be specific, in FIG. 4, the interface unit ZSI_CBn comprises a power supply P_S for generating a 15 V DC voltage, as well as an input circuit 410 for receiving an interlock signal and an output circuit 420 for outputting an interlock signal. The input circuit 410 comprises for example an active circuit connected in series between input terminals I+/I−, with this circuit comprising for example a 15 V power supply, a current-limiting resistor and an isolating detection device (e.g. a photocoupler). $S_{i\_x}$ is an input signal obtained by the input circuit 410, e.g. an interlock signal. In FIG. 4, the output circuit 420 comprises for example a base-controlled transistor, the base of which is connected to an interlock signal $S_{o\_x}$ to be outputted. $S_{o\_x}$ for example be an interlock signal generated by the CPU_CBn. When the transistor is connected into an active circuit, a valid interlock signal $S_{o\_x}$ at the base thereof can cause the transistor to conduct, thereby causing a change in the current in the active circuit. By monitoring this current change, the interlock signal outputted by the ZSI_CBn can be obtained.

In FIG. 4, the EDP_CBn comprises the ports AIO/BIO which appear in FIG. 3, which can be connected to the ports of the EDP of another circuit breaker, in order to form a bus for interlock signal transmission between EDP_CBns. In addition, the EDP_CBn further comprises an input port IE and an output port OE connected to the ZSI_CBn. The input port IE receives an interlock signal sent by the output circuit 420 in the ZSI_CBn; the output port OE sends to the input circuit 410 of the ZSI_CBn an interlock signal received by the EDP_CBn from the EDP of another circuit breaker. In the example of FIG. 4, each of AIO/BIO and IE/DE preferably comprises two terminals, one positive and one negative, wherein the negative terminal is generally ground, but is not necessarily so.

Inside the EDP_CBn shown in FIG. 4, an input bus BUS_I and an output bus BUS_O are provided between AIO and BIO. Input switches $S_{AI}$ and $S_{BI}$, and output switches $S_{AO}$ and $S_{BO}$, are provided on the input bus and output bus, respectively, these switches being controlled by a control unit MCU. A bus input circuit 510 is connected to the input bus BUS_I. A bus output circuit 520 is connected to the output bus BUS_O. The control unit MCU sends interlock signals to the output bus BUS_O via the bus output circuit 520. The control unit MCU receives interlock signals from the input bus BUS_I via the bus input circuit 510. The EDP_CBn further comprises an output circuit 530 controlled by the MCU (with control signal $S_{EO}$) and connected to the GE port, to allow the MCU to send interlock signals to the ETU. In FIG. 4, a switch $S_{EI}$ controlled by the MCU is further provided between the bus input circuit 510 and the IE port; only when the switch $S_{EI}$ is conducting can interlock signals from the ETU_CBn be received by the MCU. In FIG. 4, the bus input circuit 510 and bus output circuit 520 are the same as the input circuit 410 and output circuit 420, respectively, in the ZSI_CBn, but may be different in actual applications.

Furthermore, in order to obtain the direction of current currently flowing through the circuit breaker CBn, the MCU in FIG. 4 is further coupled to a voltage detection circuit Div and a current detection circuit CT, to obtain voltage V and current i measured in real time. Preferably, the voltage detection circuit Div is a voltage dividing circuit, which samples line voltage by voltage division. The current detection circuit CT is preferably a current mutual inductor. More preferably, the current detection circuit CT is a mutual inductor formed by combining an iron-cored current mutual inductor and a Rogowski coil current mutual inductor. The circuits Div and CT may be discrete, or shared with the ETU. In addition, The EDP_CBn in FIG. 4 is further equipped with a power supply P_S2, which provides the MCU with a DC power source of 3.3 V for example, and provides the bus input circuit 510 with a 15 V driving power source.

Figure 5:
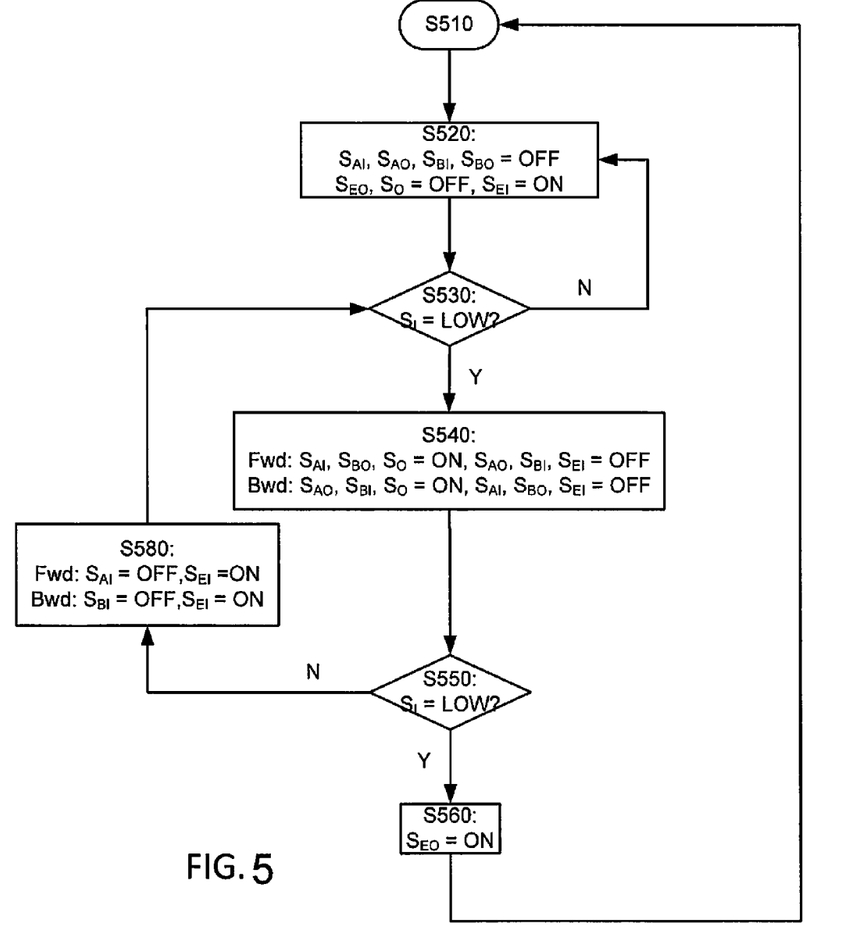
FIG. 5 shows an operating flow chart for the EDP shown in FIG. 4.

FIG. 5 shows by way of example the control procedure of the MCU in the EDP_CBn shown in FIG. 4. As FIG. 5 shows, once the circuit breaker CBn is powered on, an initialization process is carried out. In step S510, the MCU calculates the direction of current currently flowing through the circuit breaker CBn on the basis of the voltage V and current i detected by Div and CT. Here, if the direction of current is "forward (Fwd)", this can for example indicate that the direction of a fault current currently flowing through the circuit breaker is the same as the current reference direction (as in FIG. 2A) of the circuit breaker, whereas if they are not the same, the direction of current is labeled "backward (Bwd)". Of course, depending on the specific setting, this term "forward" may also be set in a different way, and for example be opposite to the current reference direction.

In step S520, the MCU cuts off the input switches $S_{AI}$ and $S_{BI}$ and the output switches $S_{AO}$ and $S_{BO}$, so that signals $S_O$ and $S_{EO}$ become invalid, but closes switch $S_{EI}$. Thus, in step S520, the MCU cuts off the connection with other circuit breakers, and switches on the connection with the ZSI_CBn alone, in order to monitor whether there is an interlock signal from the ETU. Then, in step S530, the MCU reads and determines whether a signal Si from the input circuit 510 is a valid interlock signal (e.g. LOW indicates a valid interlock signal, whereas HIGH indicates that there is no interlock signal). If the determination result in S530 is that no interlock signal has been received, the MCU returns to step S520 and continues to monitor the input from the ETU. Conversely, if the determination result in step S530 is that Si=LOW, i.e. the ETU has sent an interlock signal, then the procedure moves on to step S540.

In step S540, the MCU controls the appropriate switches and control signals according to the direction of current determined. For example, if the direction of current is determined as being backward, the MCU closes the switches $S_{AI}$ and $S_{BO}$ (ON) and sets the output signal $S_O$ to valid level (e.g. interlock signal=ON), and at the same time opens the switches $S_{AO}$, $S_{BI}$ and $S_{EI}$ (OFF). Thus, when the direction of current is backward, the MCU sends an interlock signal to the EDP of another circuit breaker from the BIO port, and at the same time receives an interlock signal from the EDP of another circuit breaker from the AIO port. Conversely, if the direction of current is forward (Fwd), the MCU closes the switches $S_{AO}$ and $S_{BI}$ (ON) and sets the output signal $S_O$ to valid level (e.g. interlock signal=ON), and at the same time opens the switches $S_{AI}$, $S_{BO}$ and $S_{EI}$ (OFF). Thus, when the direction of current is forward, the MCU sends an interlock signal to the EDP of another circuit breaker from the AIO port, and at the same time receives an interlock signal from another EDP from the BIO port. Clearly, in the EDP shown in FIG. 4, each time just one of the AIO and BIO is opened as an output port to send an interlock signal, and the other of the two is opened as an input port to receive an interlock signal from another EDP. As for which of the AIO/BIO is used as an input and which is used as an output, this depends on the direction of current determined and the relationship among circuit breakers.

Then in step S550, the MCU detects whether the bus input circuit 510 thereof has received an interlock signal from another EDP, i.e. determines whether Si=LOW holds. If it does not hold, the procedure moves on to step S580. In step S580, the input terminal IE connected to the ETU continues to be monitored for an interlock signal, in other words, the MCU closes switch $S_{EI}$ (ON), but opens (OFF) $S_{AI}$ (in the case where the direction of current is backward) or opens $S_{BI}$ (in the case where the direction of current is forward). The procedure then returns to step S530, to determine whether Si=LOW holds. If Si equals LOW (is a valid value) in step S550, this indicates that an interlock signal has been received from another EDP, so the procedure moves on to step S560. In step S560, the MCU makes the signal $S_{EO}$ a valid value ($S_{EO}$=ON), and so sends the received interlock signal to the ETU. After sending is complete, the procedure returns to step S510, to determine the direction of current again, and in this way is repeated in cycles.

Figure 6:
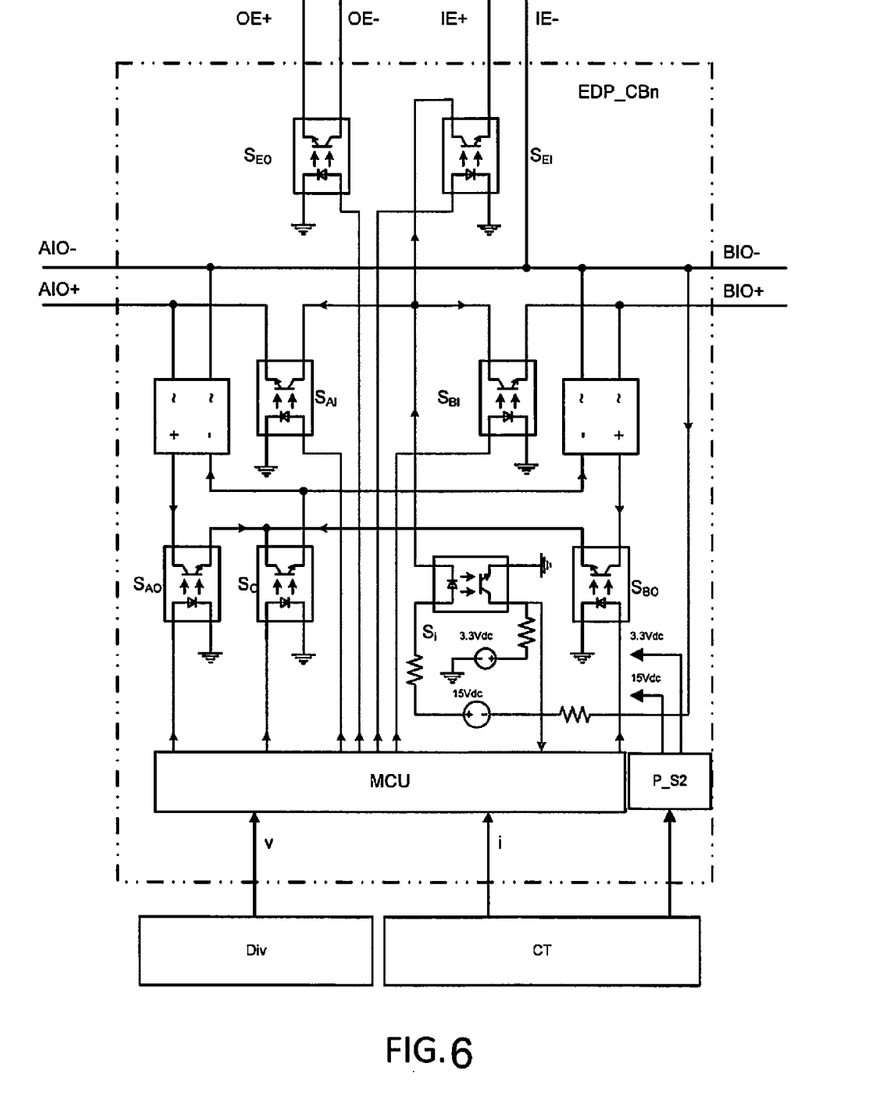
FIG. 6 shows a structural block diagram of an EDP according to an embodiment of the present invention.

FIG. 6 shows by way of example the structural block diagram of a more preferred EDP_CBn. The EDP_CBn in FIG. 6 differs from the EDP_CBn in FIG. 4 in that the switches $S_{AI}$, $S_{AO}$, $S_{BI}$, $S_{BO}$ and $S_{EI}$ are designed as isolating switches. In FIG. 6, the isolating elements are preferably photocouplers, but other isolating elements may of course also be used, for example isolating relays, etc. Besides the switches, isolating elements such as photocouplers are also used for the control signals $S_{EO}$ and $S_O$ sent by the MCU and the received signal $S_i$. The use of isolating elements can prevent damage to the MCU from leakage or faults. In addition, in the example shown in FIG. 6, the 3.3 V and 15 V power sources provided by P_S2 are both taken from the current mutual inductor CT. Thus, the EDP can supply its own electricity, and so be independent from other EDPs. Of course, P_S2 could also be provided in the form of a battery, for example.

Figure 7:
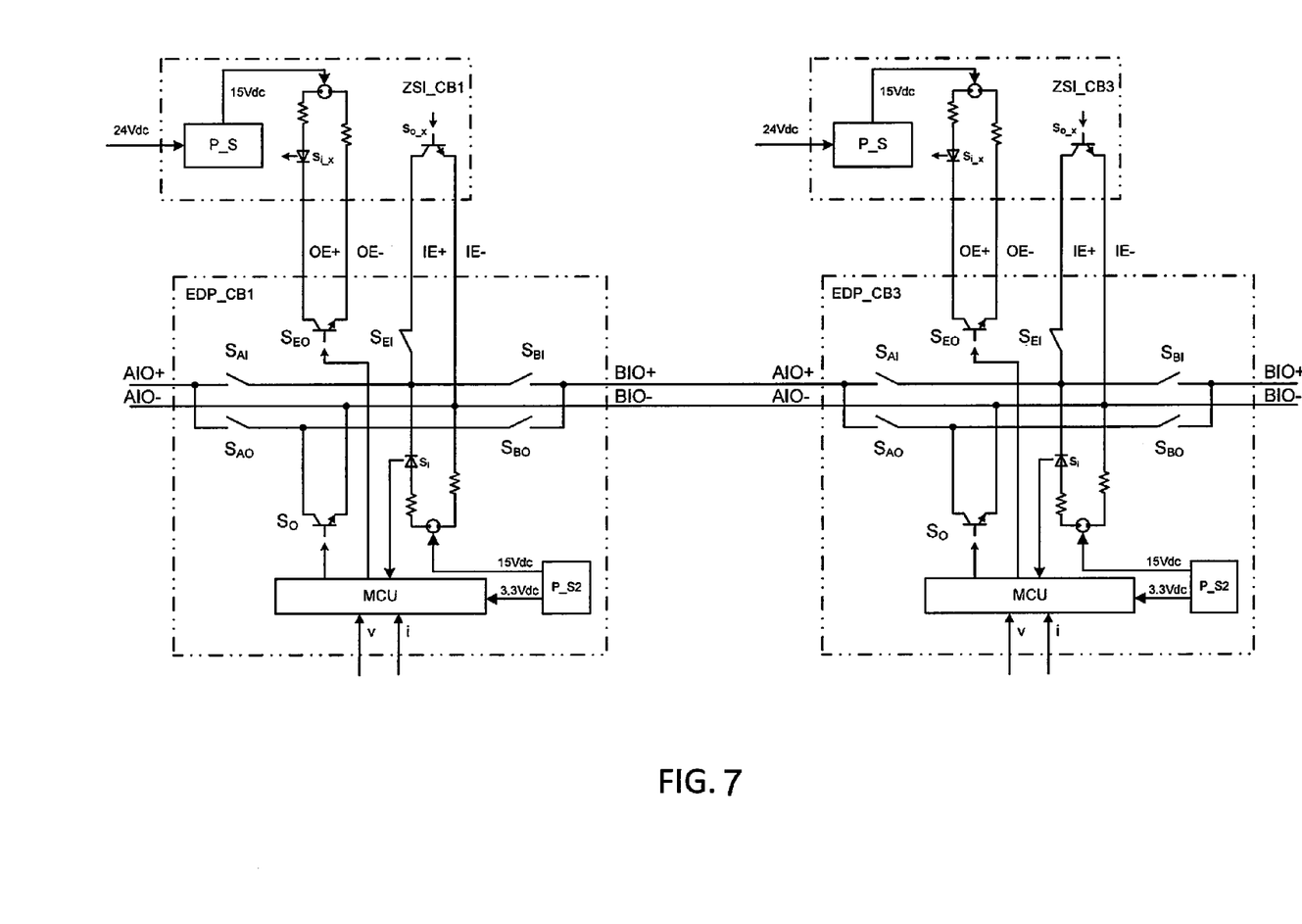
FIG. 7 shows the connection relationship between two circuit breakers having EDPs according to an embodiment of the present invention in the application scenario shown in FIG. 3, for example.

FIG. 7 shows by way of example a situation in which two EDPs as shown in FIG. 4 or 6 are connected together. For the sake of simplicity, the buses and associated circuits of switches thereon are represented in a simplified way in FIG. 7. As shown in FIG. 7, the BIO port of EDP_CB1 is connected to the AIO port of EDP_CB3. The process of operation in the situation shown in FIG. 7 is described below.

As FIG. 7 shows, supposing a fault occurs at fault point F1 shown in FIG. 1, then the flow direction of the fault current is as shown in FIG. 2A. The ETU of CB1 detects the fault first, and sets an interlock signal in ZSI_CB1 to be outputted, $S_{o\_x}$, to valid. At this point the MCU of EDP_CB1 detects that the direction of the fault current is backward (Bwd), and obtains Si=LOW according to the procedure shown in FIG. 5; hence the MCU enables a backward channel after cutting off $S_{EI}$, i.e. makes AIO an input port and outputs a valid interlock signal $S_{BO}$ from BIO to EDP_CB3. Similarly, the MCU of EDP_CB3 also detects that the direction of the fault current is backward (Bwd), but according to the procedure shown in FIG. 5 has not received a valid interlock signal from ZSI_CB3, so the MCU also enables a backward channel, i.e. makes AIO an input port and makes BIO an output port. EDP_CB3 then receives from the AIO thereof the interlock signal from EDP_CB1, and the MCU sends the interlock signal via $S_{EO}$ to the ZSI_CB3 thereof in accordance with the procedure shown in FIG. 5.

As can be seen from FIG. 7, in an embodiment of the present invention, the MCU relays the interlock signal received from the bus or the interlock signal received from the ZSI. Thus, the load of the bus input circuit 510 in each EDP is just the output of an upstream EDP, while the load of the input circuit 410 in the ZSI_CBn of the same circuit breaker is just the output circuit 530 in the EDP_CBn. Such a circuit design obviously limits the input circuit load in the EDP and ZSI, and so can enhance the expandability of the entire network, as well as increasing the stability thereof.

Those skilled in the art should understand that various changes and amendments could be made to the embodiments disclosed above without departing from the substance of the invention; all such changes and amendments should fall within the scope of protection of the present invention. Therefore the scope of the present invention should be defined by the attached claims.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A protection device for enabling a circuit breaker in a power distribution network to implement directional zone selective interlock, the circuit breaker including an interface unit capable of sending or receiving an interlock signal, the protection device comprising:
    a first port pair, including a first input port and a first output port, each connectable to the interface unit;
    a second port and a third port, coupleable to corresponding ports of a directional zone selective interlock (DZSI) protection device of another circuit breaker in the power distribution network, to transmit the interlock signal;
    an internal input bus, configured to be connected to the first input port and the second and third ports, to transmit an interlock signal received by the protection device;
    an internal output bus, configured to be connected to the second and third ports, to transmit an interlock signal to be sent from the protection device; and
    a control unit, for controlling the first port pair and the second and third ports, configured to enable one of the second and third ports as a second output port and the other one of the second and third ports as a second input port, in response to a detected direction of a current currently flowing through the circuit breaker; and configured to at least one of forward the interlock signal on the input bus that is received from the first input port onto the internal output bus, and forward an interlock signal on the input bus that is received from the second input port to the first output port, wherein
    the first input port is connected to a first input circuit, coupled to the input bus and comprising a driving power supply, for transmitting an interlock signal on the input bus to the control unit,
    the first output port is connected to a first output circuit, coupled to the first output port, for sending from the first output port an interlock signal from the control unit by way of signal isolation, and
    the control unit is connected to a second output circuit, coupled to the output bus, for outputting an interlock signal from the control unit to the output bus by way of signal isolation.

2. The protection device of claim 1, wherein the control unit is further configured to enable the second port of the second and third ports as a second output port, and the third port as a second input port, when the direction of a current currently flowing through the circuit breaker and a preset current reference direction are the same; and when a current currently flowing through the circuit breaker and a preset current reference direction are not the same, to enable the third port as a second output port, and the second port as a second input port.

3. The protection device of claim 1, wherein a second input switch and a second output switch associated with the second port are provided on the input bus and the output bus, respectively, and a third input switch and a third output switch associated with the third port are provided on the input bus and the output bus, respectively, wherein the control unit controls the second and third input/output switches, to enable the relevant port.

4. The protection device of claim 3, wherein the second and third input/output switches comprise isolating switch elements.

5. The protection device of claim 4, wherein the isolating switch elements are photocouplers.

6. The protection device of claim 1, wherein the control unit is configured to determine the direction of current currently flowing through the circuit breaker according to detected phase current and line voltage, and the protection device is further coupled to:

a current mutual inductor, for detecting the phase current; and a voltage sensing circuit, for detecting the line voltage.

7. The protection device of claim 6, wherein the control unit is powered by the current mutual inductor.

8. The protection device of claim 6, wherein the control unit is powered by at least one of line voltage and the current mutual inductor.

9. The protection device of claim 7, wherein the current mutual inductor comprises an iron-cored current mutual inductor and a Rogowski coil.

10. The protection device of claim 1, wherein the first input circuit is powered by a current mutual inductor coupled to the protection device.

11. A circuit breaker apparatus, comprising:

a circuit breaker, for switching a power supply line on or off;

an electronic trip unit, for monitoring a current flowing through the circuit breaker and controlling the switching of the circuit breaker on or off, and comprising an interface unit for receiving or sending an interlock signal; and the protection device for implementing the DZSI of claim 1.

12. The circuit breaker apparatus of claim 11, wherein at least one of the second and third ports of the protection device is connectable to a corresponding port of a protection device of another circuit breaker apparatus.

13. The protection device of claim 7, wherein the current mutual inductor comprises an iron-cored current mutual inductor and a Rogowski coil.

14. A circuit breaker apparatus, comprising:

a circuit breaker, for switching a power supply line on or off;

an electronic trip unit, for monitoring a current flowing through the circuit breaker and controlling the switching of the circuit breaker on or off, and comprising an interface unit for receiving or sending an interlock signal; and the protection device for implementing the DZSI of claim 2.

15. The circuit breaker apparatus of claim 14, wherein at least one of the second and third ports of the protection device is connectable to a corresponding port of a protection device of another circuit breaker apparatus.

16. A circuit breaker apparatus, comprising:

a circuit breaker, for switching a power supply line on or off;

an electronic trip unit, for monitoring a current flowing through the circuit breaker and controlling the switching of the circuit breaker on or off, and comprising an interface unit for receiving or sending an interlock signal; and the protection device for implementing the DZSI of claim 3.

17. The circuit breaker apparatus of claim 16, wherein at least one of the second and third ports of the protection device is connectable to a corresponding port of a protection device of another circuit breaker apparatus.

* * * * *